US 9,367,461 B2

(12) United States Patent
Aga et al.

(10) Patent No.: US 9,367,461 B2
(45) Date of Patent: Jun. 14, 2016

(54) ORDERING CONSTRAINT MANAGEMENT WITHIN COHERENT MEMORY SYSTEMS

(71) Applicants: Shaizeen Aga, Ann Arbor, MI (US); Abhayendra Singh, Ann Arbor, MI (US); Satish Narayanasamy, Ann Arbor, MI (US)

(72) Inventors: Shaizeen Aga, Ann Arbor, MI (US); Abhayendra Singh, Ann Arbor, MI (US); Satish Narayanasamy, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 128 days.

(21) Appl. No.: 14/169,594

(22) Filed: Jan. 31, 2014

(65) Prior Publication Data

US 2015/0220440 A1    Aug. 6, 2015

(51) Int. Cl.
*G06F 12/00* (2006.01)
*G06F 12/08* (2016.01)

(52) U.S. Cl.
CPC ........ *G06F 12/0835* (2013.01); *G06F 12/0831* (2013.01); *G06F 2212/621* (2013.01)

(58) Field of Classification Search
None
See application file for complete search history.

(56) References Cited

PUBLICATIONS

K. Gharachorloo et al."Two Techniques to Enhance the Performance of Memory Consistency Models", Computer Systems Laboratory, Stanford University, 10 pages.

P. Ranganathan et al., "Using Speculative Retirement and larger instruction windows to narrow the performance gap between memory consistency models", Department of Electrical and Computer Engineering, Rice University, To appear in Proceedings of SPAA-9 (Jun. 1997) 12 pages.
C. Blundell et al., "InvisiFence: Performance Transparent Memory Ordering in Conventional Multiprocessors", ISCA'09, Jun. 20-24, 2009, 2009 ACM 978-1-60558-526-0/09/06, 12 pages.
Y. Chou et al., "Store Memory Level Parallelism Optimizations for Commercial Applications", Advanced Processor Architecture Scalable Systems Group, Sun Microsystems, 12 pages.
S. Adve et al., "Shared memory consistency models: A tutorial", IEEE, 0018-9162/96, 1996, 11 pages.
A. Singh et al.,"End to End Sequential Consistency", IEEE 978-1-4673-0476-4/12, 2012, pp. 524-535.
C. Bienia et al., "The PARSEC Benchmark Suite: Characterization and Architectural Implications", Princton Unioversity Technical Report TR-811-08, Jan. 2008, 22 pages.
S. Cameron Woo et al.,"The Splash2 Programs: Characterization and Methodological considerations", To appear in the Proceedings of the $22^{nd}$ Annual International Symposium on Computer Architecture, Jun. 1995, 13 pages.
"The FeS2 simulator", FeS2: A Full-system Execution-driven Simulator for x86, http://fes2.cs.uiuc.edu/, retrieved Jan. 29, 2014, 2 pages.

*Primary Examiner* — Brian Peugh
(74) *Attorney, Agent, or Firm* — Nixon & Vanderhye P.C.

(57) ABSTRACT

A data processing system including multiple processors 6, 8, 10, 12 each with a local cache memory 14, 16, 18, 20 share a main memory 24 under control of a coherency controller 22. Store requests from a store requester which are to be serviced by data received from the main memory 24 trigger the coherency controller 22 to return exclusive rights to access the data to the store requester before the corresponding data is returned from the main memory 24. The store requester uses possession of the exclusive rights to access the data to permit further processing with an ordering constraint relative to the store request to proceed even though the store request has yet to be finished. The ordering constraint may be, for example, a fence instruction. The store requester in possession of the exclusive rights to access the data values ensures that the store request is finished and its results observed by any instruction as required by the ordering constraint it has released early.

18 Claims, 7 Drawing Sheets

ORDERING CONSTRAINT MANAGEMENT WITHIN COHERENT MEMORY SYSTEMS

BACKGROUND OF THE INVENTION

1. Field of the Invention

This invention relates to the field of data processing systems. More particularly, this invention relates to data processing systems utilising coherent memory management in which multiple copies of data may be stored in different memories within the system under control of coherency management mechanisms enforcing a required degree of coherence between the different copies of the same data.

2. Description of the Prior Art

It is known to provide data processing systems in which multiple copies of data values may be held at different points within the data processing system. For example, a system including multiple processors may have a local cache memory associated with each of these processors. The multiple processors may all be connected to a shared main memory. The local cache memories may hold a copy of data held within the main memory and it is possible for multiple cache memories to hold copies of the same data. Within such systems it is important that coherence between the multiple data values should be maintained such that, if it is required, an individual processor sees the most up-to-date version of a data value and should a data value be changed within one of the cache memories, then that updated data value is ultimately written back to the main memory. There are many known mechanisms for controlling the coherence and data access ordering between the different data values depending upon the requirements of the system.

One ordering management technique employs fence instructions (ordering instructions) within the stream of program instructions executed by a processor. Such fence instructions have the behaviour that they are not committed until all memory accesses preceding the fence instruction within the program stream have been completed. Another approach to ordering management is to ensure sequential consistency using, for example, a variety of micro-architectural techniques such that all memory access operations give results corresponding to the memory access operations being performed in the order in which they are located within the stream of program instructions being executed. While these techniques ensure a degree of coherence as desired, they can impose performance constraints in some circumstances. As an example, if a store operation is to be performed and the data concerned is not already cached within the local cache of the processor performing the store operation, then that data may require fetching from the main memory to the local cache memory of the processor concerned before the store operation may be completed. The latency associated with this fetch of the data from the main memory may be considerable. If a fence instruction is preventing processing proceeding further until a preceding stalled store instruction is completed, then a considerable loss in performance will arise. However, the fence instruction in this circumstance does ensure that the preceding store operation is completed as intended before processing subsequent to the fence instruction is permitted.

SUMMARY OF THE INVENTION

Viewed from one aspect the present invention provides apparatus for processing data comprising:

a plurality of memory access request sources configured to generate memory access requests and each having a cache memory configured to store one or more blocks of data values corresponding to respective blocks of memory addresses within a memory address space of a main memory;

a coherency controller configured to receive from a store requester, that is one of said plurality of memory access request sources, a store request seeking:

(i) to retrieve from said main memory to a cache memory of said store requester a target block of data from a target block of memory addresses within said memory address space; and (ii) to store one or more new data values within said target block of data retrieved to said cache memory of said store requester; and to control provision to said store requester of an exclusive right to access data values of said target block of data; wherein said coherency controller is configured to cause provision of said exclusive right to said store requester before said target block of data is retrieved from said main memory to said cache memory of said store requester; and said store requester is enabled by said exclusive right to perform a further processing operation having an ordering constraint specifying that said further processing operation follows said storing of said one or more data values to said target block of data without waiting for said one or more data values to be stored to said target block of data.

The present invention recognises that ordering constraints may be satisfied by ensuring that a store requester is granted the required exclusive right to perform the store operation that is pending (even though the store itself has not been performed) before further processing operations subject to the ordering constraint are permitted to proceed. The grant of the exclusive right to the store requester and the receipt of that exclusive right by the store requester may be considered to correspond to a "promise" being made by the store requester that it will complete the store operation concerned in a manner such that the further processing operation will see the correct result of that store operation should this arise. The present technique effectively decouples the provision of the exclusive right to access the data to the store requester from the data concerned actually being sent to the store requester. A store requester in possession of the exclusive right is in control of its ability to perform the store operation that is pending in a manner such that it will be observed to have effect for a further processing operation which is subject to the ordering constraint even though the further processing operation is allowed to proceed before the store operation has actually been performed.

It will be appreciated that if the target block of data is stored within the cache memory of the store requester before the store requester generates its store request, then a fetch of that data from the main memory will not be required. It is a fetch of the data from the main memory which is the source of a potentially undesirably large latency and accordingly is a target of the present technique in seeking to permit further processing operations to proceed sooner when an ordering constraint is present and a long latency fetch from the main memory is required.

The coherency controller is responsible for managing the coherency within the memory system. The coherency controller may be a single circuit block or may be distributed in multiple locations within the memory system.

The coherency controller may be designed to operate in a variety of different ways. In some embodiments, the coherency controller may be configured to send a coherency control response indicating grant of the exclusive right (access permission) to the store requester. In other embodiments, the coherency controller may provide such a response indirectly, such as by triggering another element within the system to provide a signal to the store requester indicating that the exclusive right has been granted. In other embodiments the granting of the exclusive right may be implied, such as, for example, by not receiving a message indicating that the exclusive right has not been granted. All of the above techniques for indicating grant of an exclusive right, and other techniques of achieving this same end, are encompassed by the present techniques.

It will be appreciated that the memory access request sources could take a variety of different forms. For example, a memory access request source may be a DMA unit, a data engine, an input/output interface etc. However, in some embodiments the plurality of memory access request sources may include one or more processors executing respective streams of program instructions. Such multi-processor systems are increasingly common in high performance systems and often utilise coherent memory systems to facilitate parallel execution.

It will be appreciated that in some embodiments the ordering constraint may arise due to an ordering instruction present within a stream of program instructions being executed. Such an ordering instruction specifies that memory operations prior to the ordering instruction within the stream of program instructions be completed before committing processing results following the ordering instruction. Such ordering instructions are sometimes referred to as fence instructions or barrier instructions.

In some embodiments the store requester may include store queue circuitry serving to store data representing an ordered queue of store operations yet to be committed. The store queue circuitry may store data representing whether or not the exclusive right has been granted for each of those queued store operations. The provision of store queue circuitry assists in techniques such as data forwarding within pipelined processing systems.

The store requester may also include a store buffer configured to store data values for committed store requests that have yet to be written to storage locations of the target block of data. Such store buffers are one way of mitigating the problems associated with limited memory access bandwidth. The store buffer may, for example, take the form of an ordered or unordered coalescing write buffer. The store buffer may be configured to store data representing whether or not the exclusive right has been granted for the different store operations corresponding to the data values held within the store buffer.

In some embodiments the data indicative of the exclusive right may be an exclusive access permission bit.

An alternative to systems employing ordering instructions may be to form a system in accordance with a sequentially consistent memory model whereby all memory access operations give results corresponding to those memory access operations being performed in an order in which they appeared within the stream of program instructions. A variety of micro-architectural techniques may be used to achieve such a sequentially consistent memory access model when the instructions are actually executed out of order as will be familiar to those in this technical field. The present techniques may be utilised to mitigate some of the performance constraints associated with the use of a sequentially consistent memory model by permitting a further processing operation subject to an ordering constraint to at least start to be performed prior to a preceding store operation actually being finished.

When the store requester is holding an exclusive right for a store operation which has yet to be finished, then the store requester has effectively made a promise that it will complete that store operation. Accordingly, should the store requester receive a request to relinquish the exclusive right, then it may be configured to determine if all stores of data values to the target block within the cache memory of the store requester have been made. If all such writes have been made, then the exclusive right may be relinquished, but if any of the writes relating to the exclusive right concerned have not been made, then the exclusive right should not be relinquished until those writes have been made.

In some embodiments the latency associated with communication between the plurality of memory access request sources may be considerably lower than the latency associated with communication to the main memory. Such an arrangement is often found, such as when the main memory is formed in a separate integrated circuit. The present techniques target such circumstances by permitting further processing operations, subject to an ordering constraint, to proceed when the data has not yet been returned from the main memory.

It will be appreciated that the coherency controller could take a variety of different forms. Some coherency controllers employ snooping operations. Other coherency controllers may be directory-based and store directory data indicative of permissions granted to respect ones of the plurality of memory access request sources for different regions of the memory address space.

In the case of receipt of a store request for a target block stored within the cache memory of another memory access request source, at least some embodiments may be configured to provide the exclusive right to the store requester at the same time as the data concerned is sent from the another memory access request source to the store requester. As previously mentioned, the latency associated with such cache-to-cache data transfers may be relatively low and accordingly there may be no particular need to relax the ordering constraint as conventionally provided by ordering instructions or a sequentially consistent memory model.

Viewed from another aspect the present invention provides apparatus for processing data comprising:

a plurality of memory access request source means for generating memory access requests and each having cache memory means for storing one or more blocks of data values corresponding to respective blocks of memory addresses within a memory address space of main memory means for storing data;

coherency control means for receiving from a store requester, that is one of said plurality of memory access request source means, a store request seeking:

(i) to retrieve from said main memory means to a cache memory means of said store requester a target block of data from a target block of memory addresses within said memory address space; and (ii) to store one or more new data values within said target block of data retrieved to said cache memory means of said store requester; and for controlling provision to said store requester of an exclusive right to access data values of said target block of data; wherein said coherency control means causes provision of said exclusive right to said store requester before said target block of data is retrieved from said main memory means to said cache memory means of said store requester; and said store requester is enabled by said exclusive right to perform a further processing operation having an ordering constraint specifying that said further processing operation follows said storing of said one or more data values to said target block of data without waiting for said one or more data values to be stored to said target block of data.

Viewed from a further aspect the present invention provides a method of processing data comprising the steps of:

generating memory access requests with a plurality of memory access request sources each having a cache memory for storing one or more blocks of data values corresponding to respective blocks of memory addresses within a memory address space of main memory;

in response to a store request from a store requester, that is one of said plurality of memory access request sources, said store request seeking:

(i) to retrieve from said main memory to a cache memory of said store requester a target block of data from a target block of memory addresses within said memory address space; and (ii) to store one or more new data values within said target block of data retrieved to said cache memory of said store requester, providing to said store requester an exclusive right to access data values of said target block of data; wherein said exclusive right is provided to said store requester before said target block of data is retrieved from said main memory to said cache memory of said store requester; and said store requester is enabled by said exclusive right to perform a further processing operation having an ordering constraint specifying that said further processing operation follows said storing of said one or more data values to said target block of data without waiting for said one or more data values to be stored to said target block of data.

The above, and other objects, features and advantages of this invention will be apparent from the following detailed description of illustrative embodiments which is to be read in connection with the accompanying drawings.

DESCRIPTION OF THE EMBODIMENTS

Figure 1:
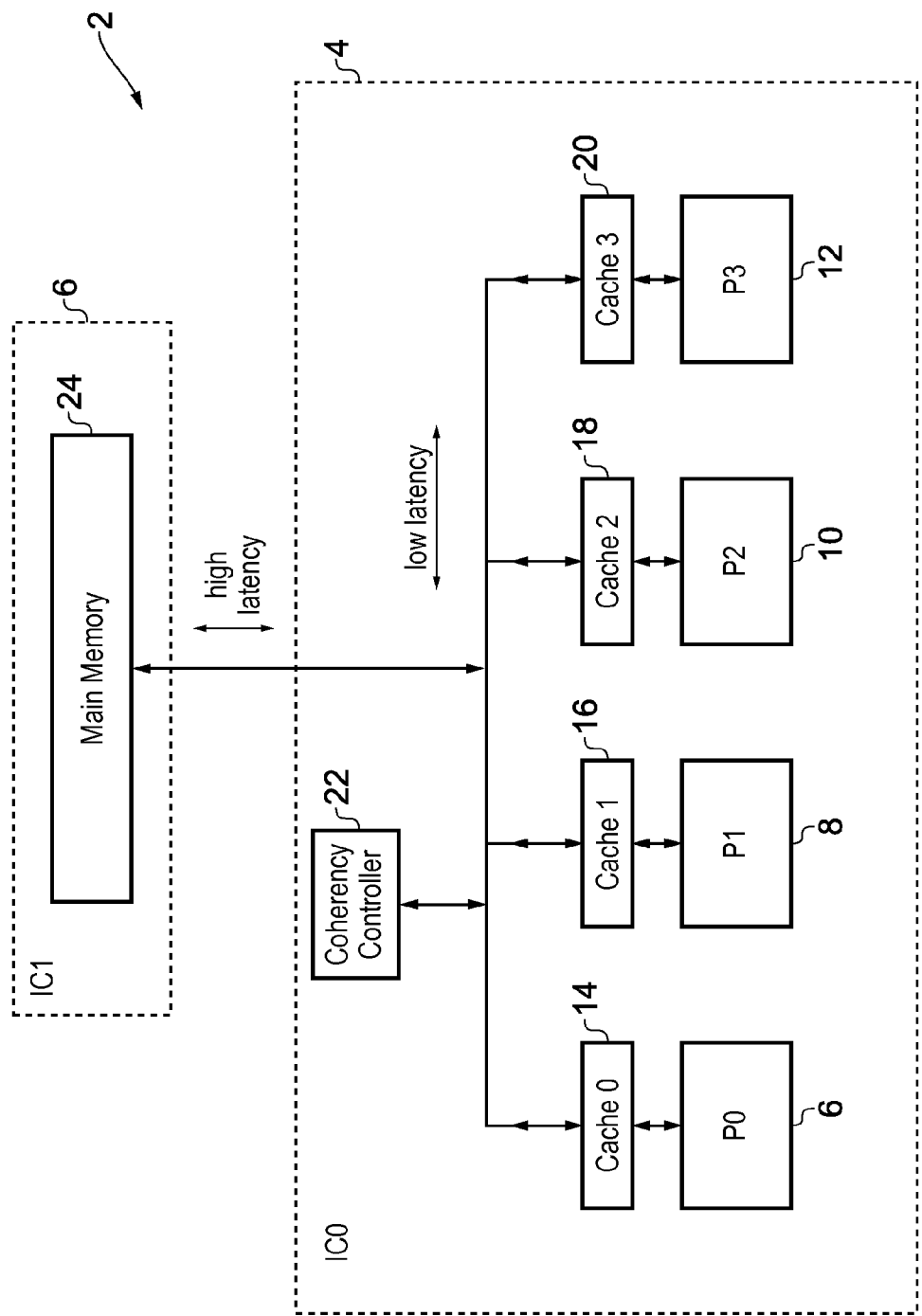
FIG. 1 schematically illustrates a data processing apparatus including a plurality of processors each having an associated local cache memory and executing a stream of program instructions and sharing a main memory.

FIG. 1 schematically illustrates a data processing system 2 including a first integrated circuit 4 and a second integrated circuit 6. The first integrated circuit 4 includes a plurality of processors 6, 8, 10, 12 each executing a respective stream of program instructions. Each of the processors 6, 8, 10, 12 has an associated local cache memory 14, 16, 18, 20. A coherency controller 22 serves to monitor requests for data to be fetched into any of the local cache memories 14, 16, 18, 20 and then either service such requests by fetching the data from a main memory 24 located within the integrated circuit 6 or from a copy of the data held within another of the local cache memories 14, 16, 18, 20. The coherency controller 22 may be directory-based coherency control storing directory data indicating which of the local caches 14, 16, 18, 20 store blocks of data values from which memory addresses within the memory address space. As will be familiar to those in this technical field, the coherency controller 22 may operate in accordance with a coherency protocol such as MESI, MOESI, etc. When a block of data values is provided to one of the cache memories 14, 16, 18, 20, it is associated with an indication as to the basis upon which those data values are held by the local cache, i.e. whether the data is held exclusively, shared or is owned by the local cache concerned. The base role of the coherency controller 22 in controlling the coherency of data values between the local cache memory 14, 16, 18, 20 and the main memory 24 in accordance with, for example, one of the above mentioned protocols will be familiar to those in this technical field and will not be described further herein.

It will be appreciated that the on-chip communication between the processors 6, 8, 10, 12 and their respective local caches, 14, 16, 18, 20 will be relatively low latency communication whereas the off-chip communication between any of the elements within the integrated circuit 4 and the main memory 24 will be relatively high latency. Accordingly, store requests which require data values to be returned from the main memory 24 to one of the local caches 14, 16, 18, 20 will incur a significant latency penalty and may cause the processor concerned 6, 8, 10, 12 to stall, or at least extend any delay associated with a fence instruction which requires all preceding memory operations to be completed prior to committing any instructions following the fence instruction to update the system state (architectural state).

In operation a store request issued from one of the processors 6, 8, 10, 12 which misses within its associated local cache 14, 16, 18, 20 will cause a store request to be forwarded to the coherency controller 22. The coherency controller 22 will use its directory data to determine whether or not the data corresponding to the store request is held by another of the local caches 14, 16, 18, 20. If the data is held by another of the local caches 14, 16, 18, 20, then the data and an exclusive right will be returned together (at the same time) to the local cache 14, 16, 18, 20 of the processor 6, 8, 10, 12 which made the store request. The exclusive right and the data are returned together with relatively low latency given that all the accesses concerned are on-chip.

If the coherency controller 22 determines that the store request is to data which is held within the main memory 24, then the coherency controller 22 serves to return an exclusive right to the requesting processor 6, 8, 10, 12 without waiting for the data associated with the fetch to be available. At this time, the data for the store request is not available as this data must be retrieved over the relatively high latency communication channel between the integrated circuit 4 and the integrated circuit 6. However, the processor 6, 8, 10, 12 which receives the exclusive right (exclusive right to access data values of the target block of data) is able to use possession of this exclusive right to permit further processing operations having an ordering constraint specifying that the further processing operation should follow the storing of the one or more data values of the store request to proceed without waiting for the one or more data values to actually be returned from the main memory 24. Possession of the exclusive right by the store requester (the processor 6, 8, 10, 12, which made the store request) is sufficient for the store requester to then take responsibility for ensuring that the store operation is performed when the data values are returned from the main memory 24 such that processing operations subsequent to the store request and which have the ordering constraint will be performed on the basis of the data values returned by the store request (i.e. they will see that returned data if they make an access to it).

The ordering constraint may be imposed by an ordering instruction, such as a fence instruction, or may be imposed by the architectural form of the processor, such as the processor having a sequentially consistency memory mode.

It will be appreciated that the store requests will be to units of data values. These units may be target blocks of data values, such as cache lines or cache blocks which represent the granularity with which data values are fetched from the main memory 24 to each of the local caches 14, 16, 18, 20. It will be appreciated that this granularity may vary from embodiment-to-embodiment and the present techniques are not restricted to any particular level of granularity.

Figure 2:
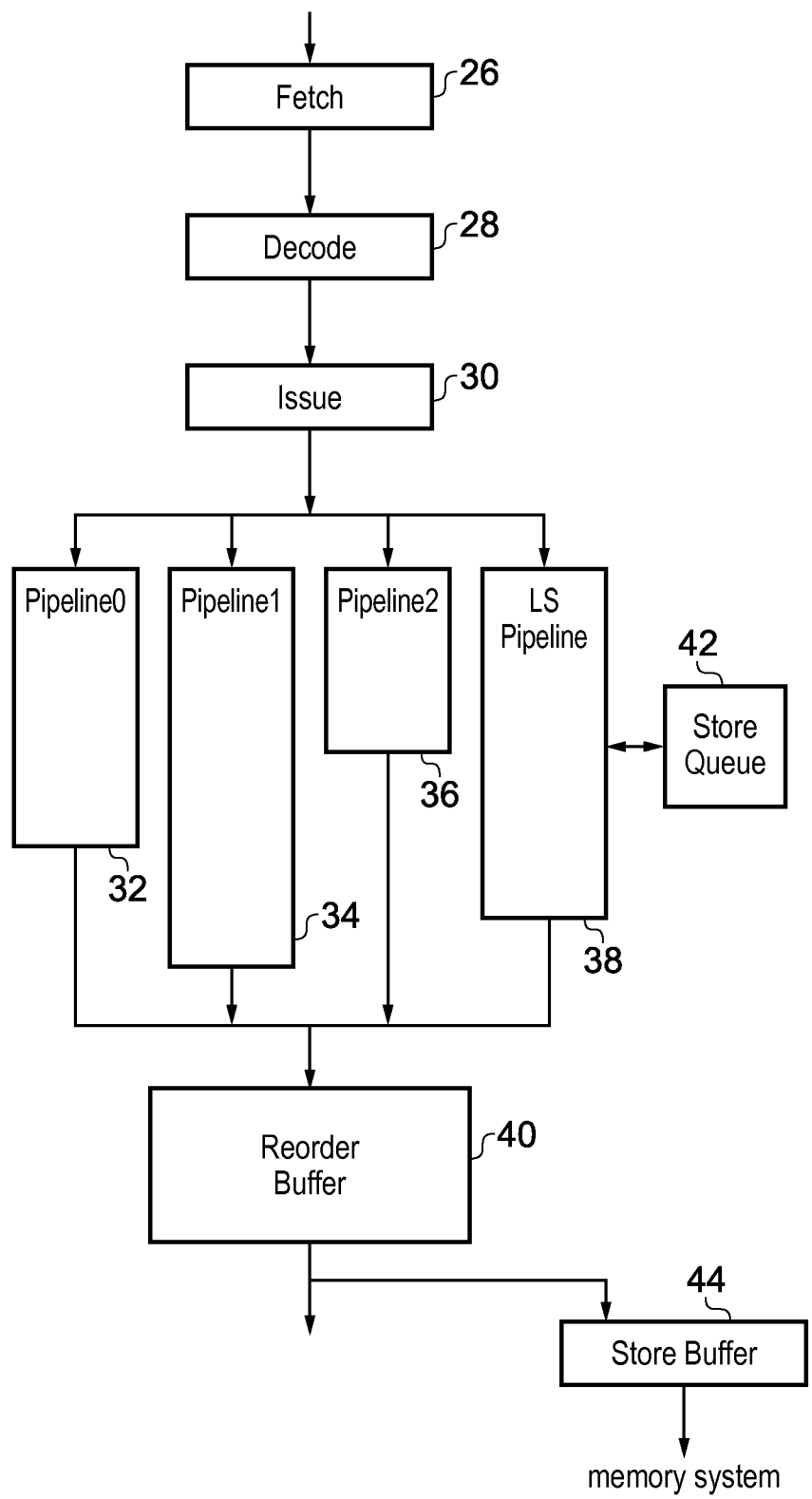
FIG. 2 schematically illustrates part of a processing pipeline within one of the processors of FIG. 1.

FIG. 2 schematically illustrates a portion of a processing pipeline within one of the processors 6, 8, 10, 12. The pipeline stages include a fetch stage 26, a decode state 28, an issue stage 30, a plurality of execution pipeline 32, 34, 36, 38 and a reorder buffer 40. The fetch stage 26 fetches program instructions to be executed. The decode stage 28 decodes these program instructions (at least partially). The issue stage 30 issues the program instructions to the appropriate execution pipeline 32, 34, 36, 38 to execute those instructions. Examples of the pipelines 32, 34, 36, 38 may include an integer pipeline, a floating point pipeline, a SIMD pipeline and a load/store pipeline. In the example illustrated, a load/store pipeline 38 is provided for performing operations corresponding to load requests and store requests.

The reorder buffer 40 is responsible for managing the buffering of state corresponding to program instructions which have been executed within the pipelines 32, 34, 36 and 38 and committing this to update the state of the processor (architectural state) in an order consistent with the program instruction order in the stream program instructions being executed.

The load/store pipeline 38 has store queue circuitry 42. This store queue circuitry 42 stores data representing an ordered queue of store operations yet to be committed from the reorder buffer 40. The provision of such a store queue enables functions such as data forwarding to be achieved as will be familiar to those in this technical field. The store queue circuitry 42 stores an exclusive right bit associated with each store operation represented within the store queue circuitry 42. This exclusive right bit indicates whether or not the associated store operation has or has not received exclusive rights to access the data values corresponding to the store operation concerned.

Downstream of the reorder buffer 40 there is provided a store buffer 44. The store buffer 44 (e.g. an unordered coalescing write buffer) stores data values which have been committed to be performed from the order buffer 40, but have yet to be written to the target block of data within the local cache memory concerned. The data values stored within the store buffer 44 also have associated with them exclusive access permission bits which indicate whether or not exclusive rights to access the data values concerned have been granted by the coherency controller 22.

Figure 3:
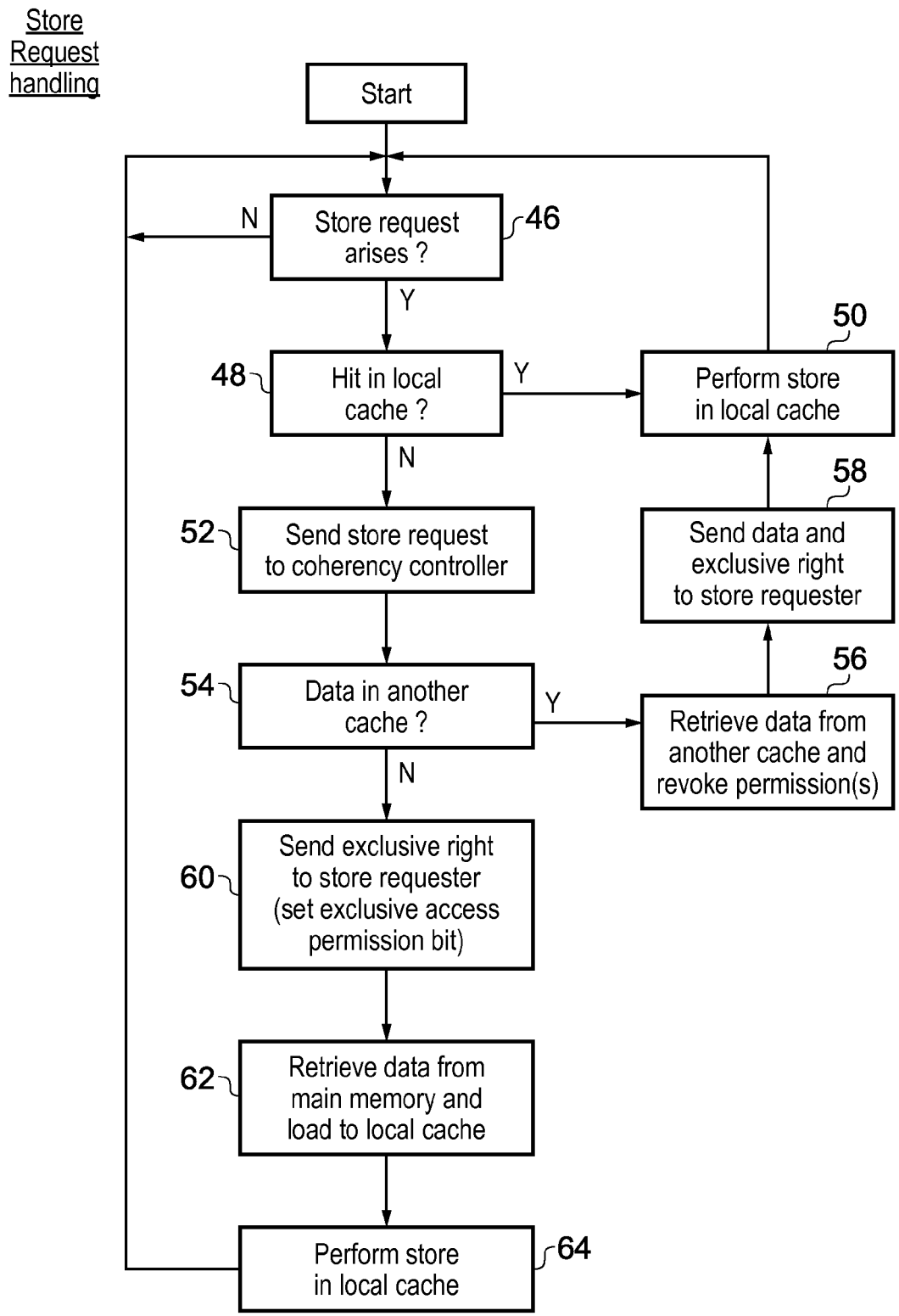
FIG. 3 is a flow diagram schematically illustrating store request handling.

FIG. 3 is a flow diagram schematically illustrating the handling of a store request. At step 46 processing waits until a store request arises. Step 48 then determines whether the store request concerned hits within the local cache memory of the processor that is the source of that store request. If there is a hit within the local cache memory, then step 50 performs the store operation to the data held within the local cache memory.

If step 48 does not result in a hit within the local cache memory, then step 52 sends the store request to the coherency controller 22. At step 54 the coherency controller determines whether the data values concerned are held within another of the local cache memories. If the data values concerned are held within another of the local cache memories, then step 56 serves to retrieve the data from the another cache memory and revoke any permissions associated with that data held by the another cache memory. It will be appreciated that the retrieving of this data may be directly from the another cache or maybe indirectly via the main memory in some embodiments. Step 58 then serves to send the data and the exclusive right together to the store requester which generated the store request at step 46. Step 50 then performs the store operation within the local cache.

If the determination at step 54 was that the data was not held in another cache, then processing proceeds to step 60 at which the coherency controller 22 returns an exclusive right (exclusive rights to access the data values concerned) to the store requester. At this time, the data values concerned are not available as these need to be fetched from the main memory 24. Nevertheless, the exclusive right is sent in advance. As the data values are not held within any of the local caches 14, 16, 18, 20, it is correct to indicate that the store requester has an exclusive right as the data values concerned are not being used elsewhere. The exclusive right received at the processor 6, 8, 10, 12 is used to set an exclusive right bit first within store queue circuitry 42 and subsequently within the store buffer 44.

Step 62 proceeds to retrieve the data of the store request from the main memory 24 and return it to the store requester. Step 64 performs the store operation within the local cache to which the data has been returned.

Figure 4:
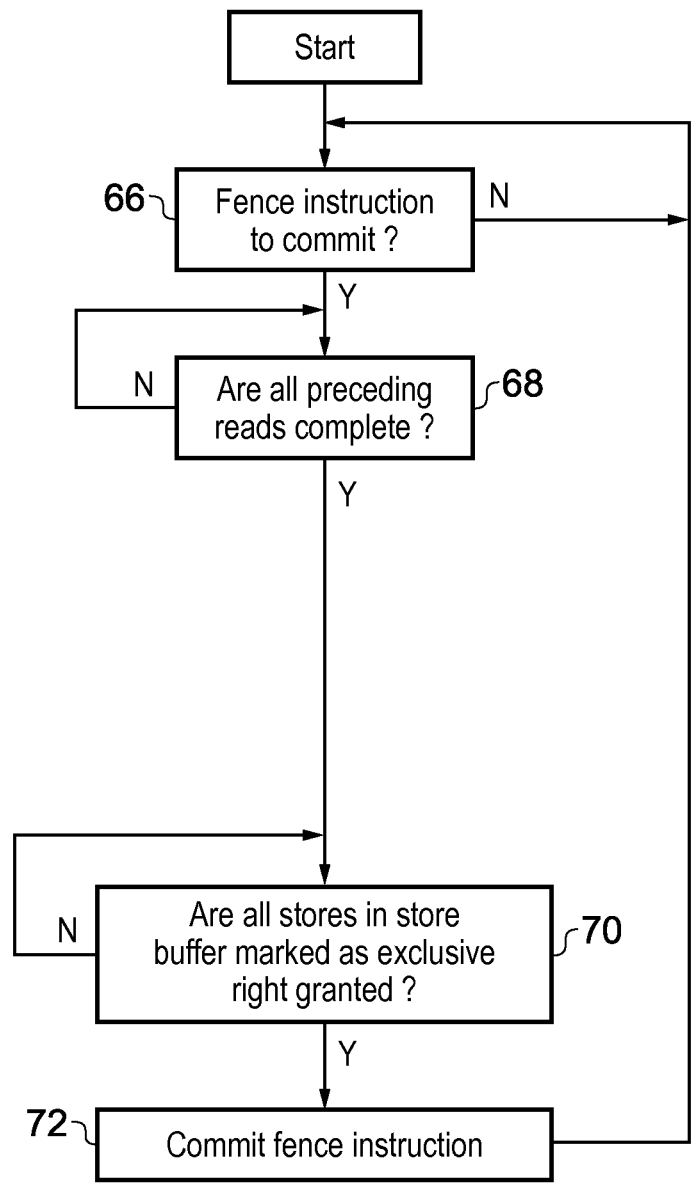
FIG. 4 is a flow diagram schematically illustrating fence instruction handling.

FIG. 4 is a flow diagram schematically illustrating fence instruction handling in one of the processors 6, 8, 10, 12. At step 66 processing waits until a fence instruction is at the point corresponding to the head of the reorder buffer 40 at which it is the next instruction requiring to be committed. When such a fence instruction is the next instruction to be permitted, processing proceeds to step 68 where it is determined whether or not all preceding read operations have been completed. When all such preceding read operations have been completed, then processing proceeds to step 70 where it is determined whether or not all store operations corresponding to entries within the store buffer 44 are marked as having an exclusive right granted. When all the stores within the store buffer are so marked, then processing proceeds to step 72 where the fence instruction is committed and released from the reorder buffer 40 thereby permitting subsequent instructions within the stream of program instructions to be committed without delay.

Figure 5:
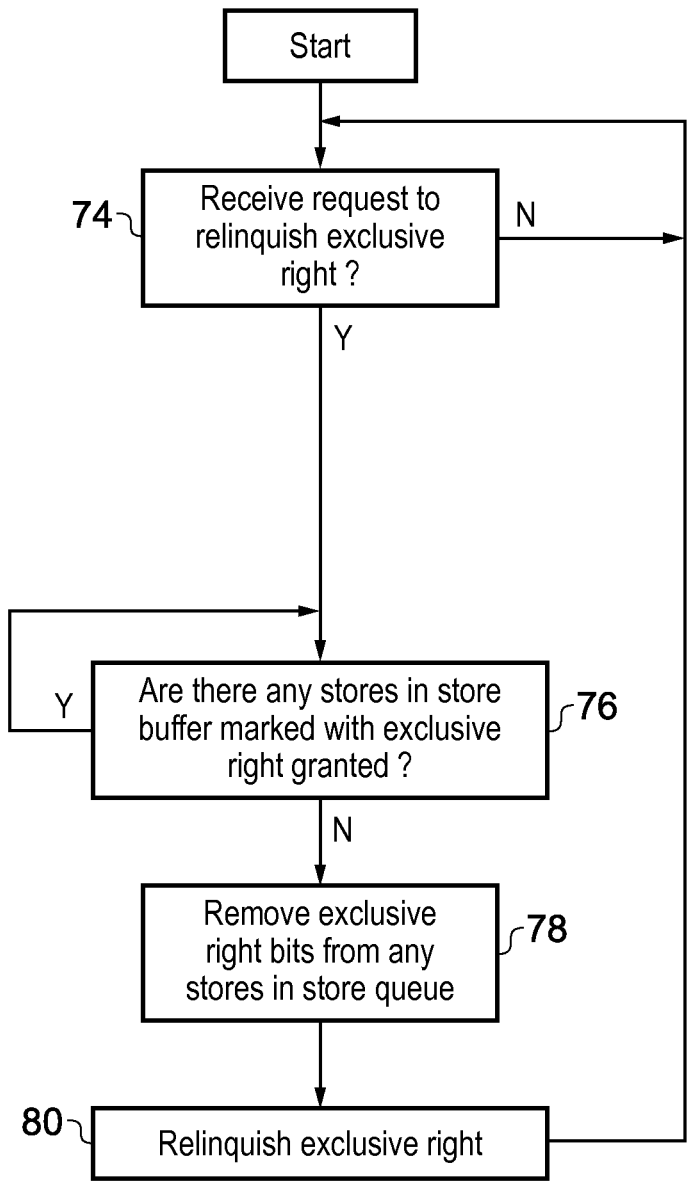
FIG. 5 is a flow diagram schematically illustrating relinquish request handling.

FIG. 5 is a flow diagram schematically illustrating the handling of a request to relinquish exclusive right. At step 74 a processor waits until it receives a request to relinquish the exclusive right. When such a request is received, processing proceeds to step 76 where processing waits until there are no stores pending within the store buffer which are marked as having exclusive access granted to those stores. Once there are no preceding stores within the store buffer 44 that are marked as having exclusive access granted, then processing may proceed to step 78 where any exclusive rights marked for store instructions held within the store queue circuitry 42 may be removed. The store instructions held within the store queue circuitry 42 correspond to store instructions which have not yet been committed and so may have their permissions altered without adverse effect. Step 80 returns a response indicating that the exclusive right has been relinquished.

Figure 6:
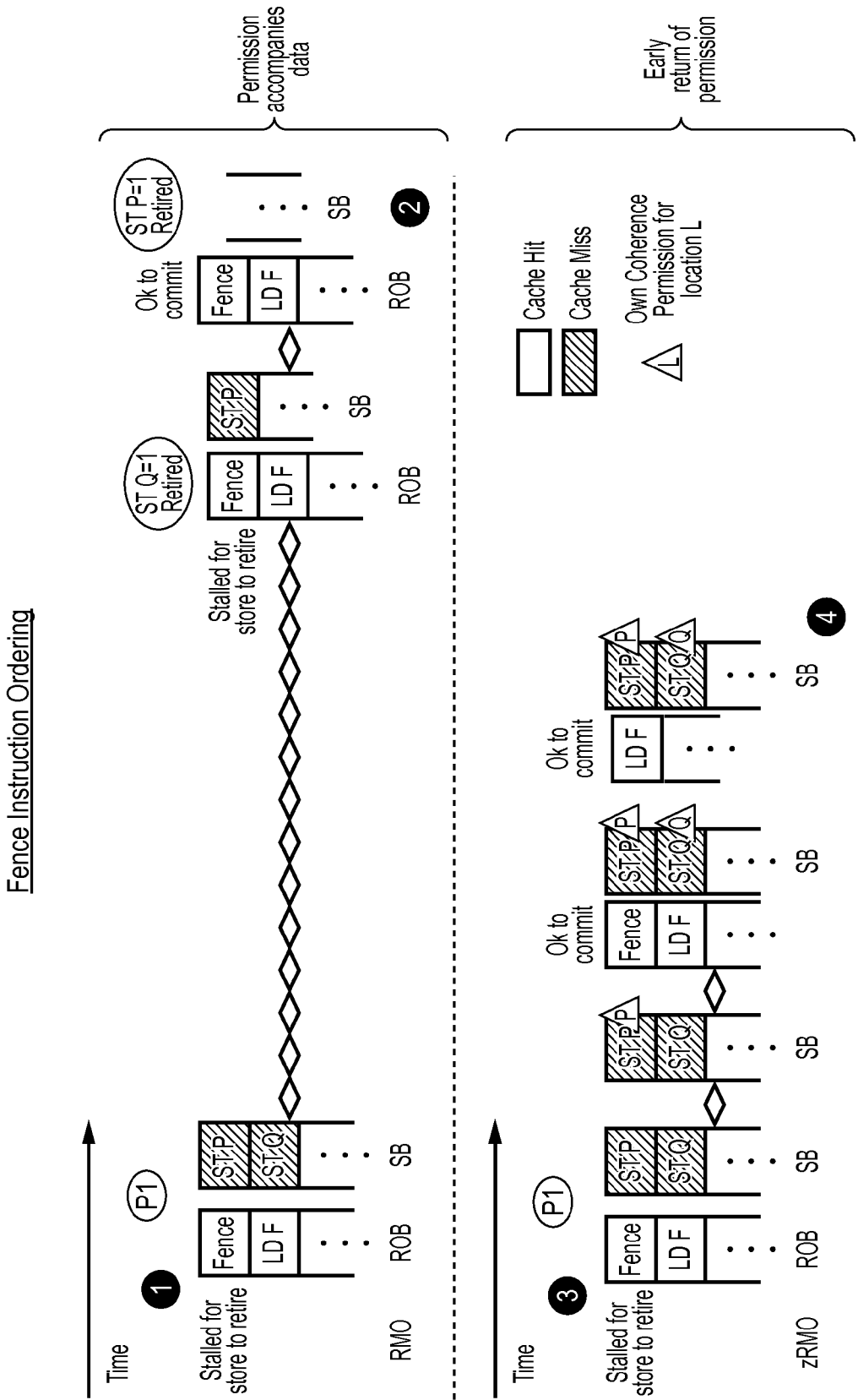
FIG. 6 is a diagram schematically illustrating the effects of ordering imposed by a fence instruction with or without the use of the present techniques.

FIG. 6 is a diagram schematically illustrating effects of the execution of a fence instruction with and without use of the present techniques. The top portion of FIG. 6 illustrates operation not using the present techniques. The store buffer SB contains a store to address Q followed by a store to address P. The reorder buffer ROB contains a fence instruction followed by a load to address F. The fence instruction is unable to be committed as the store instructions within the store buffer have yet to be competed. The store to address Q is to the main memory 24 and takes many processing cycles to complete. When the data is returned from the main memory 24, it is accompanied by the exclusive rights to access that data and return to the local cache memory such that the store operation can then complete. The store to address Q is retired at that time. The store to address P is a store to the local cache memory and completes relatively quickly, but nevertheless the fence instruction must wait until it is completed. Finally, the stored buffer is empty as the store to address P has been retired and then it is permitted to commit the fence instruction.

At the bottom of FIG. 6 uses the present techniques and is illustrated using the same starting state but in this circumstance the exclusive rights to access the data values concerned is returned early from the coherence controller 22. The return of the exclusive rights is indicated by the addition of a triangle to the representation of the instruction. As will be seen, after relatively few cycles, both the store to address P and the store to address Q have received their exclusive rights. The data values need not necessarily have been returned at this time, but the processor is able to determine that all of the store operations preceding the fence instruction have received their exclusive rights and so the fence instruction is permitted to commit This unblocks the reorder buffer and permits the subsequent load from address F to complete more rapidly. Thus, the fence instruction is able to serve its function of imposing an ordering constraint whilst having a reduced effect on processing throughput.

Figure 7:
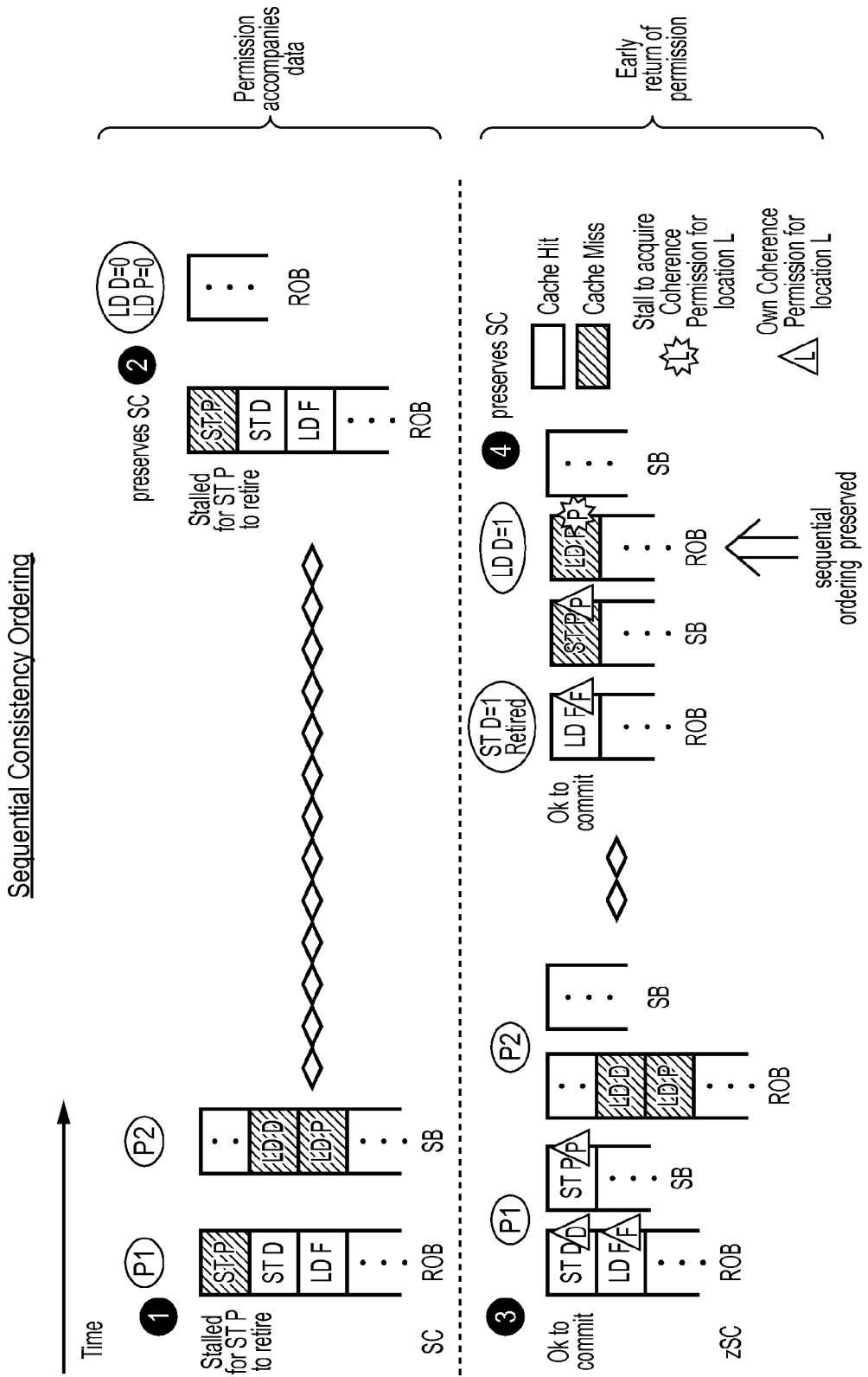
FIG. 7 schematically illustrates the effects of ordering imposed by a sequential consistency memory model with or without the use of the present techniques.

FIG. 7 is a diagram schematically illustrating processing in accordance with a sequentially consistent memory model both with and without the use of the present techniques. In the top portion of FIG. 7, operation is illustrated when the exclusive right data accompanies the data, i.e. is not sent early. Processor P1 processes a sequence of instructions including a store to address P, a store to address D and a load from address F. The processor P2 executes instructions including a load from address D followed by a load from address F. The load from address D followed by the load from address P are performed in turn in the correct order. Accordingly, sequential consistency is preserved. The store to address P by the processor P1 remains stalled until its data and access permission are both available and are returned together to the processor P1. At that time the store to address P may be retired.

The lower portion of FIG. 7 illustrates how the present technique whereby early exclusive rights may be returned can be adopted without violating sequential consistency within systems which require such ordering. The same sequence of instructions are executed by each of the processors P1 and P2. In processor P1 all of the loads and stores have received their necessary permissions and the store to address D may be retired quickly as it is a hit within the local cache memory concerned. Accordingly, the store to address D has been retired and committed while the preceding store to address P has yet to be retired. When the processor P2 then seeks to perform a load from address D followed by a load from address P, the load from address D will be permitted to proceed as there is no clash with a permission held by the processor P1. However, when the load of address P is attempted, then it will be stalled as the store to address P to be performed by the processor P1 has yet to be made while the processor P1 is holding the exclusive rights for address P. This prevents the load of address P by the processor P2 being performed until the store to address P by the processor P1 has been committed. Accordingly, sequential consistency is preserved as processor P2 is prevented from observing a state in which the store by processor P2 to address D occurs before the store by processor P1 to address P. The processor P1 thus fulfils its promise to ensure executed instructions see the data in accordance with a sequential consistent memory model.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
    a plurality of memory access request sources configured to generate memory access requests and each having a cache memory configured to store one or more blocks of data values corresponding to respective blocks of memory addresses within a memory address space of a main memory;
    a coherency controller configured to receive from a store requester, that is one of said plurality of memory access request sources, a store request seeking:
    (i) to retrieve from said main memory to a cache memory of said store requester a target block of data from a target block of memory addresses within said memory address space, and
    (ii) to store one or more new data values within said target block of data retrieved to said cache memory of said store requester, and
    to provide to said store requester an exclusive right to access data values of said target block of data, wherein:
    said coherency controller is configured to provide of said exclusive right to said store requester before said target block of data is retrieved from said main memory to said cache memory of said store requester; and
    said store requester is enabled by said exclusive right to perform a further processing operation having an ordering constraint specifying that said further processing operation follows said storing of said one or more data values to said target block of data without waiting for said one or more data values to be stored to said target block of data.

2. Apparatus as claimed in claim 1, wherein said target block of data is not stored within said cache memory of said store requester before said store requester generates said store request.

3. Apparatus as claimed in claim 1, wherein said coherency controller is configured to send a coherency control response indicating grant of said exclusive access permission to said store requester.

4. Apparatus as claimed in claim 1, wherein said plurality of memory access request sources include one or more processors executing respective streams of program instructions.

5. Apparatus as claimed in claim 4, wherein said store requester is a processor executing a stream of program instructions and said further processing operation is committing processing results following an ordering instruction, said ordering instruction specifying that memory operations prior to said ordering instruction within said stream of program instruction be completed before committing processing results following said ordering instruction.

6. Apparatus as claimed in claim 4, wherein said one or more processors are configured to operate in accordance with a sequentially consistent memory model whereby all memory access operations give results corresponding to said memory access operations being performed in an order in which said memory access operations are located within said stream of program instructions.

7. Apparatus as claimed in claim 1, wherein said store requester comprises store queue circuitry configured to store data representing an ordered queue of store operations yet to be committed, said store queue circuitry configured to store data representing said exclusive right associated with each of said store operations.

8. Apparatus as claimed in claim 7, wherein said data representing said exclusive is an exclusive right bit.

9. Apparatus as claimed in claim 1, wherein said store requester comprises a store buffer configured to store data values for committed stored requests that are yet to be written to said target block of data, said store buffer configured to store data representing said exclusive right associated with each of said store operations.

10. Apparatus as claimed in claim 9, wherein said data representing said exclusive right is an exclusive right bit.

11. Apparatus as claimed in claim 1, wherein said store requester is configured to respond to a request to relinquish said exclusive right by:
(i) determining if all stores of data values to said target block stored within said cache memory of said store requester by said store requester have been have been made, and one of:
(ii) relinquishing said exclusive right when all stores of data values to said target block stored within said cache memory of said store requester by said store requester have been made, and
(iii) not relinquishing said exclusive right when all stores of data values to said target block stored within said cache memory of said store requester by said store requester have not yet been made.

12. Apparatus as claimed in claim 1, wherein said plurality of memory access request sources and said coherency controller have a first level of latency for communication therebetween and said plurality of memory access request sources and said main memory have a second level of latency for communication therebetween, said second level being greater than said first level.

13. Apparatus as claimed in claim 12, wherein said plurality of memory access request sources and said coherency controller are formed together in a first integrated circuit and said main memory is formed within a second integrated circuit separate from said first integrated circuit.

14. Apparatus as claimed in claim 1, wherein said coherency controller is a directory-based coherency controller configured to store directory data indicative of permissions granted to respective ones of said plurality of memory access request sources to access data values within blocks of memory addresses within said memory address space.

15. Apparatus as claimed in claim 1, wherein said coherency controller is configured to receive a further store request seeking:
(i) to retrieve from a cache memory of another of said plurality of memory access request sources to said cache memory of said store requester a target block of data from a target block of memory addresses within said memory address space, and
(ii) to store one or more new data values within said target block of data retrieved to said cache memory of said store requester, and to provide to said store requester an exclusive right to access data values to said target block of data, wherein:
said coherency controller is configured to provide of said exclusive right to said store requester not before said target block of data is retrieved from said cache memory of said another of said plurality of memory access request sources to said cache memory of said store requester.

16. Apparatus as claimed in claim 1, wherein said plurality of memory access request sources comprise a plurality of processors sharing said main memory.

17. Apparatus for processing data comprising:
a plurality of memory access request source means for generating memory access requests and each having cache memory means for storing one or more blocks of data values corresponding to respective blocks of memory addresses within a memory address space of main memory means for storing data;
coherency control means for receiving from a store requester, that is one of said plurality of memory access request source means, a store request seeking:
(i) to retrieve from said main memory means to a cache memory means of said store requester a target block of data from a target block of memory addresses within said memory address space, and
(ii) to store one or more new data values within said target block of data retrieved to said cache memory means of said store requester, and
for providing to said store requester an exclusive right to access data values of said target block of data, wherein
said coherency control means provides of said exclusive right to said store requester before said target block of data is retrieved from said main memory means to said cache memory means of said store requester, and
said store requester is enabled by said exclusive right to perform a further processing operation having an ordering constraint specifying that said further processing operation follows said storing of said one or more data values to said target block of data without waiting for said one or more data values to be stored to said target block of data.

18. A method of processing data comprising the steps of:
generating memory access requests with a plurality of memory access request sources each having a cache memory for storing one or more blocks of data values corresponding to respective blocks of memory addresses within a memory address space of main memory;
in response to a store request from a store requester, that is one of said plurality of memory access request sources, said store request seeking:
(i) to retrieve from said main memory to a cache memory of said store requester a target block of data from a target block of memory addresses within said memory address space, and
(ii) to store one or more new data values within said target block of data retrieved to said cache memory of said store requester,
providing to said store requester an exclusive right to access data values of said target block of data, wherein
said exclusive right is provided to said store requester before said target block of data is retrieved from said main memory to said cache memory of said store requester, and
said store requester is enabled by said exclusive right to perform a further processing operation having an ordering constraint specifying that said further processing operation follows said storing of said one or more data values to said target block of data without waiting for said one or more data values to be stored to said target block of data.

* * * * *